United States Patent [19]

Mazzoni

[11] Patent Number: 4,468,126

[45] Date of Patent: Aug. 28, 1984

[54] HIGH EFFICIENCY SCREW FEEDERS FOR CONTINUOUS EXTRUSION AND REFINING OF SOAPS, DETERGENTS AND OTHER SIMILAR PLASTIC PRODUCTS

[75] Inventor: Guido Mazzoni, Busto Arsizio, Italy

[73] Assignee: Costruzioni Meccaniche G. Mazzoni S.p.A, Busto Arsizio, Italy

[21] Appl. No.: 267,296

[22] Filed: May 26, 1981

[30] Foreign Application Priority Data

Jun. 5, 1980 [IT] Italy ................................ 22574 A/80

[51] Int. Cl.³ .............................................. B29B 1/06
[52] U.S. Cl. ........................................ 366/87; 366/79
[58] Field of Search ................... 366/79, 88, 89, 323, 366/327, 326, 99, 279, 318, 320, 321, 322, 324, 87

[56] References Cited

U.S. PATENT DOCUMENTS

| | | |
|---|---|---|
| 2,872,703 | 2/1959 | Gambrill et al. . |
| 3,398,219 | 8/1968 | Kelly et al. . |
| 3,541,652 | 11/1970 | Fischer .................................. 366/89 |
| 3,701,512 | 10/1972 | Schippers et al. .................... 366/88 |
| 4,053,143 | 10/1977 | Mosokawa et al. .................. 366/89 |
| 4,125,333 | 11/1978 | Fields .................................... 366/79 |
| 4,129,386 | 12/1978 | Rauwendaal .......................... 366/88 |
| 4,170,446 | 10/1979 | Schutz et al. ......................... 366/87 |

*Primary Examiner*—Philip R. Coe
*Assistant Examiner*—Michael Knick
*Attorney, Agent, or Firm*—Young & Thompson

[57] ABSTRACT

Screw feeder or Archimedian screw for pasty materials, such as soap, wherein the winding angle of the screw ranges between 15° and 25°, and the screw height, diameter and thrust length depend on the section of bar extrusion and/or free passage area of the refining holes.

6 Claims, 7 Drawing Figures

HIGH EFFICIENCY SCREW FEEDERS FOR CONTINUOUS EXTRUSION AND REFINING OF SOAPS, DETERGENTS AND OTHER SIMILAR PLASTIC PRODUCTS

This invention relates to screw feeders or Archimedian screws used in extrusion and refining operations of pasty mixtures, such as those for the production of soaps.

The extrusion and refining of this type of products is provided by machines commonly referred to as dies or extruders, which by means of a helix or screw feeder rotating within a static cylinder press the product and cause its flow out of the extruding unit in the form of bar, pellets, thin spaghetti-like elements, etc.

The screw feeders at present used in continuous extrusion of soaps, detergents and other plastic products comparable thereto are of low efficiency and subject to the so-called phenomenon of "pumping". Such a term indicates high oscillations or variations in flow rate (when the minimum flow rate approaches zero) occurring under particular operating conditions of the die. They also have high costs of construction due to the complicated geometry of the helix or screw. Because of the drawbacks presented by the hitherto used screw feeders, up to now only screw feeders are provided having complicated geometries and a highly reduced angle of inclination for the helix or screw (in the range of 8°–12°), so that such feeder screws have a high manufacturing cost and low efficiency.

It is the object of the present invention to overcome the above described disadvantages of the present screw feeders, providing an increased efficiency to be found as follows:

(a) a higher production at the same r.p.m. of the helix or screw;

(b) for the same production or output, a reduction is provided in power consumption and the helix or screw is rotated at a lower r.p.m.

It is still another object of the invention to reduce the above mentioned phenomenon of "pumping," in that under the operating conditions at which the present screw feeders or Archimedian screws would "pump," a screw feeder according to the present invention will continue to produce with a constant flow rate.

It is still a further object of the invention to reduce the costs of construction by simplifying the screw feeder geometry.

The above mentioned objects have been achieved by designing screw feeders, the geometrical characteristics of which in the "metering section" are a function of or depend on the geometrical characteristics of the bar extrusion and/or refining unit.

Three particular cases are also provided, and namely that of bar extrusion only, of refining only and refining combined with bar extrusion.

The invention will now be more clearly explained with reference to some embodiments thereof given by mere way of unrestrictive example, as shown in the accompanying drawings, in which:

FIG. 1 is a view showing by way of example the typical assemblies of the machine in which the screw feeder operates. Such assemblies should not be construed as restrictive, since the screw feeder could operate with quite different assemblies. Particularly:

Figure 1A:
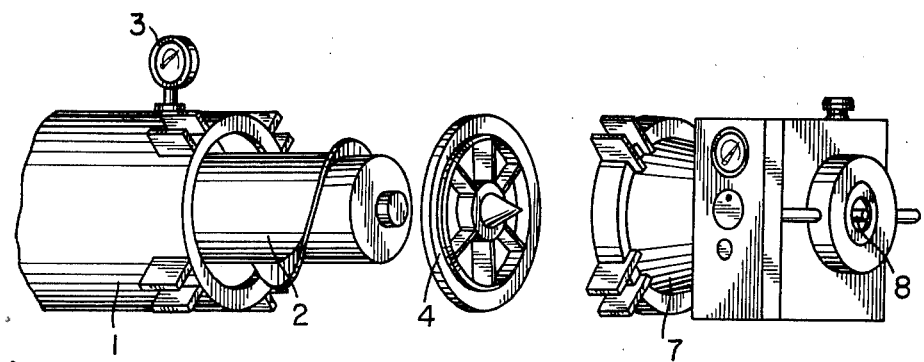
FIG. 1(a) is an exploded view of a bar extrusion device without any refining step; such an extrusion unit is used for producing a continuous bar product extruded from the die.

From the assemblies shown in FIG. 1, it will be seen that the following reference numerals indicate the parts or elements as hereinafter specified:

(1) cylinder, (2) screw feeder, (3) gauge, (4) spoke member, (5) screen, (6) perforated plate, (7) conical head, (8) die, (9) knives.

Figure 2:
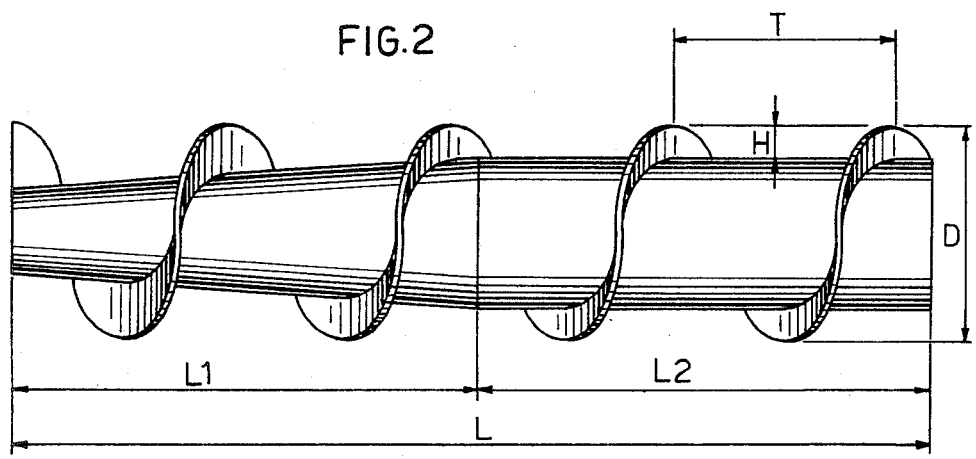
FIG. 2 is a view showing the screw feeder according to the invention with the geometrical dimensions as used in the calculation method.

Moreover, in FIG. 2 the individual reference letters indicate as follows:

$L$ = total length of the helix or screw from the spiral start to the end thereof;

$L1$ = length of the helix or screw section referred to as "compression section"; this part underlies the loading hopper and is of no significance in the present invention;

$L2$ = length of the helix or screw section within the machine cylinder, except for the section involved by the loading hopper, this section $L2$ being referred to as "metering section," and being a characteristic element of the screw feeder;

$D$ = outer diameter of the screw, also referred to as screw thread;

$H$ = depth of the helix screw thread at the metering section as measured from the cylindrical surface having diameter D to the surface of the helix or screw body also referred to as "drum;"

$T$ = helix pitch, constant throughout the screw; and $\phi$ = angle of winding for the spiral on the drum as calculated on the outer diameter D of said screw by the formula:

$$\phi = \text{arctg}\left(\frac{T}{\pi \cdot D}\right)$$

A screw feeder or Archimedian screw according to the present invention should be made so that:

$$H = k \cdot \frac{A}{(\sin \phi)^{\frac{2}{3}}} \cdot \left(\frac{L2}{D}\right)^{\frac{1}{3}}$$

wherein all of the measures are expressed in millimeters, k is a constant between 0.9 and 1.8 and A is a value which depends on the extrusion and refining characteristics as follows:

For bar extrusion without refining $$A = (-2701.16 + 853.85 \ln b)^{\frac{1}{3}}$$

wherein b = equivalent diameter of the extruded bar in millimeters ln = natural logarithm The equivalent diameter of the extruded bar is the diameter of the right section (circular) of a hypothetical bar having the same area of the right section as that of the cross section of the extruded bar.

The cross section of the extruded bar may be of any desired shape. The extruded bars may be more than one, in which case the area of the cross section of the hypothetical bar will be the sum of the individual areas of the cross sections.

Such an equivalent diameter b may take any desired value, although in the figures of the accompanying drawings such a diameter has been restricted to a range of 30–80 mmVV.

The bar extrusion unit as shown in FIG. 1(a) is only for indication purposes, it being understood that for the purposes of the calculation process the unit is described only by the equivalent diameter b of the extruded bar.

For refining only:

$$A = (-69.91 + 0.0316 \times c)^{\frac{1}{2}}$$

wherein c = free passage area for the refining units, which is the available area for the product to pass through the unit (see details 4, 5 and 6 in FIG. 1) free of all possible occlusions in the screen or in the refining device as determined by bearings for the device.

Figure 1B:
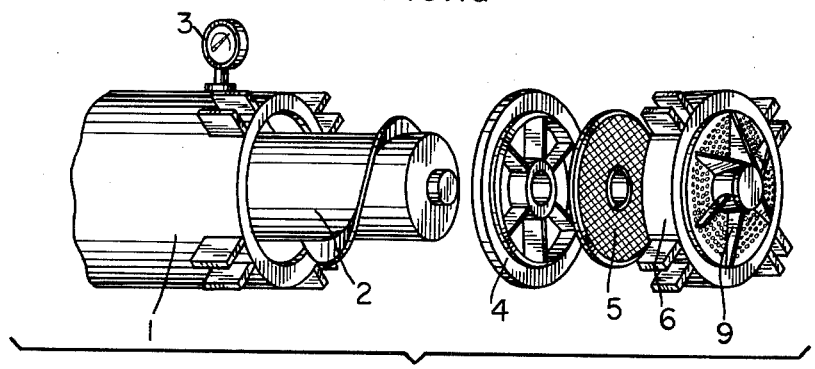
FIG. 1(b) is an exploded view of a refining unit; such a refining unit is used for refining the product and/or producing pellets (cylindrical tablets having various ratios of length to diameter), thin spaghetti-like elements and so on extruded from the die.

The refining unit as shown in FIG. 1(b) is merely for indication purposes, it being understood that for the purposes of the calculation process the unit is described only by the free passage area.

Figure 1C:
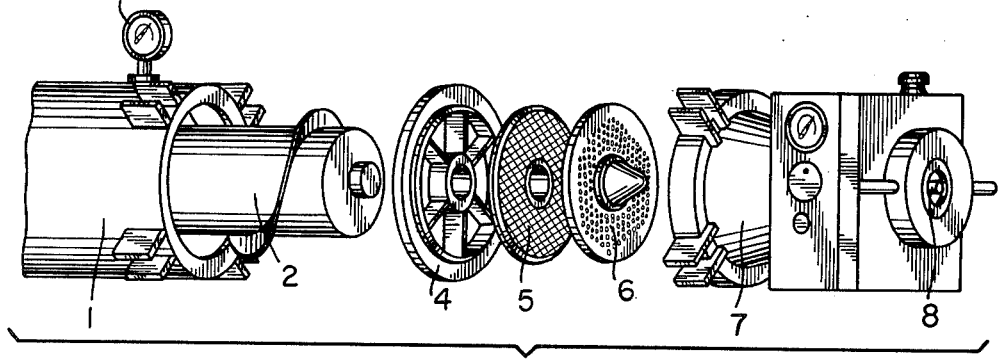
FIG. 1(c) is an exploded view of a bar extrusion device with refining; such a processing is used to refine the product and at the same time to produce a continuous bar at the outlet of the die.

For bar extrusion with refining:

$$A = \left( \frac{1}{-2701.16 + 853.85 \times \ln b} + \frac{1}{-69.91 + 0.316 \times c} \right)^{-\frac{1}{2}}$$

wherein b = equivalent diameter of the extruded bar in millimeters;

c = free passage area in the refining unit (see details 4, 5 and 6 in FIG. 1(c)) in square millimeters, and ln = natural logarithm.

The equivalent diameter of the extruded bar and the free passage area have been already defined.

The bar extrusion and refining unit as shown in FIG. 1(c) is only for illustrative purposes, it being understood that for the purposes of the calculation process the unit is described only by the free passage area and by the equivalent diameter of the extruded bar.

Figure 3:
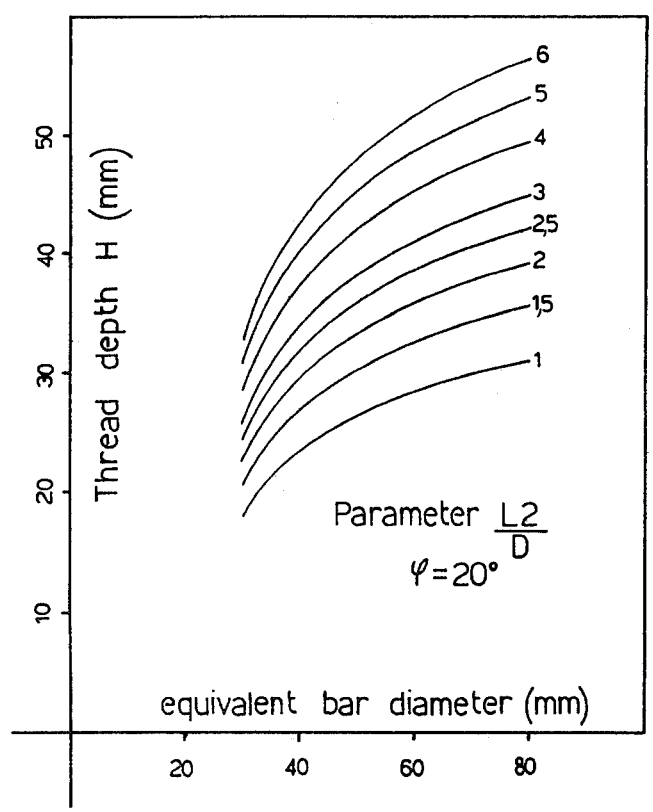
FIGS. 3, 4 and 5 are parametrical graphic views of three sets of screw feeders for the three different uses as above specified.

In FIG. 3 there is parametrically shown the equation relating to the bar extrusion without refining, that is for the unit described in FIG. 1(a). This diagram provides the depth H (mm) for the helix or screw thread in accordance with the equivalent diameter (mm) of the extruded bar with the parameter L2/D varying between 1 and 6. The formula is shown in the range of equivalent diameters between 30 mm and 80 mm. This diagram, given by mere way of example, is related to the particular case where the screw angle is 20°.

Figure 4:
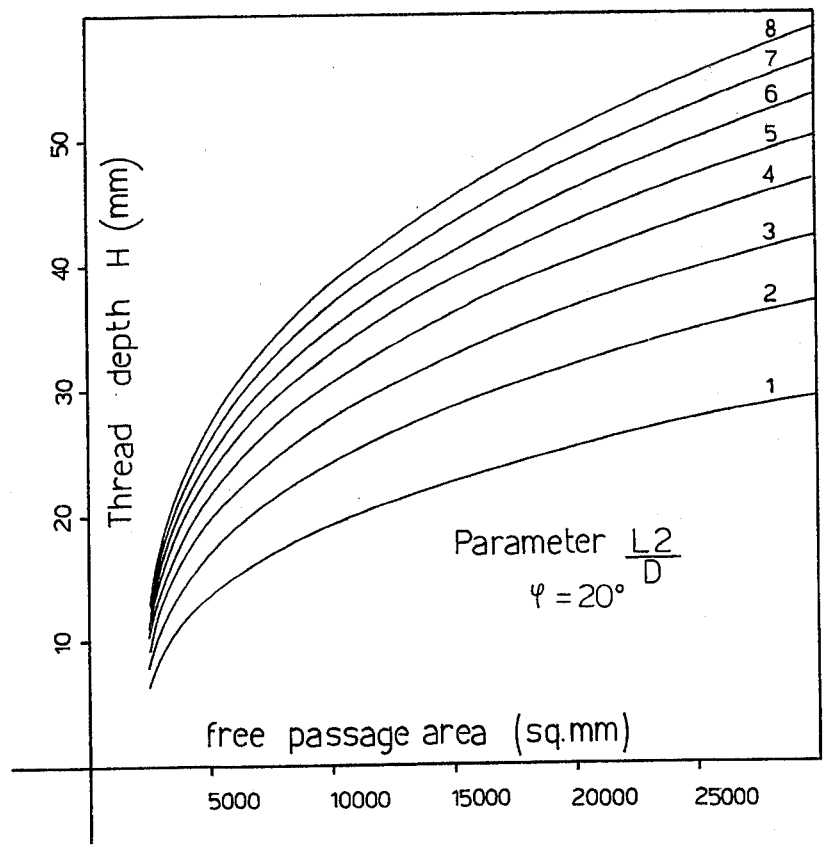

In FIg. 4 the parametrical representation has been given for the equation relating the helix or screw thread depth H (mm) to the free passage area of sq. mm. with parameter L2/D varying between 1 and 8 for the unit described in FIG. 1(b), that is comprising the refining alone of the product.

By free passage area it should be understood that passage area which is available for the product of the refining unit (see details 4, 5 and 6 of FIG. 1) free of all possible occlusions in the screen as determined by bearings for said screen. The formula is shown in the range of free passage areas between 2,500 sq. mm. and 30,000 sq. mm. This diagram relates to the particular case where the spiral angle is 20°.

Figure 5:
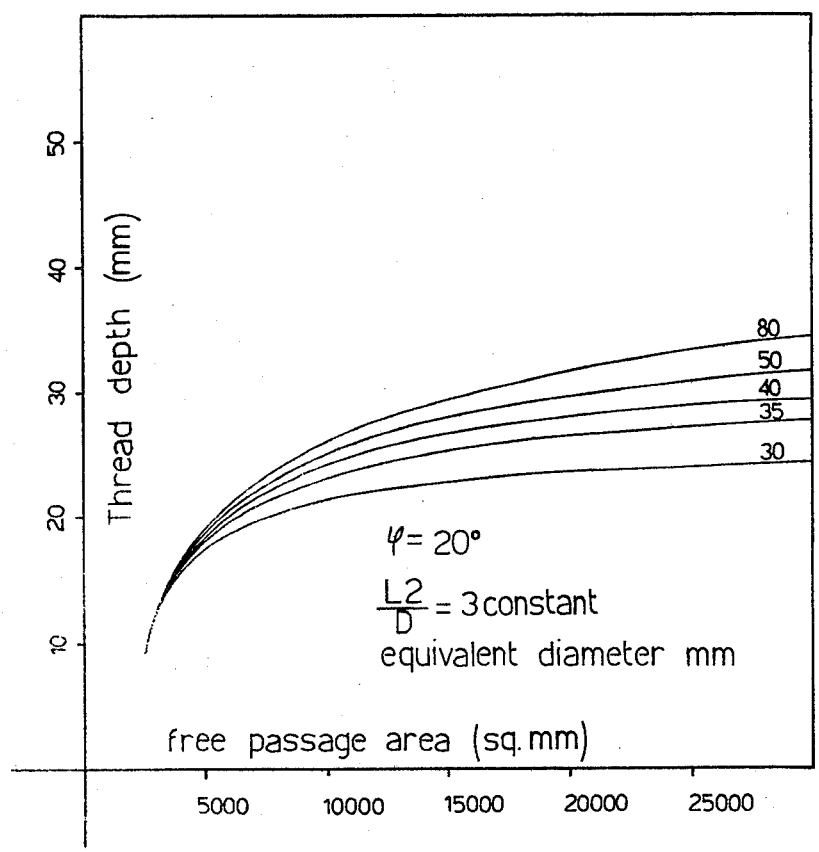

In FIG. 5 there is shown a parametrical exemplary graphic representation of the equation giving the screw thread depth H (mm) and the free passage area in sq. mm. for the extrusion and refining unit described in FIG. 1(c), using the equivalent diameter of the bar as parameter. Therefore, this diagram shows the set of curves having the equivalent diameter of the bar as parameter, with L2/D = 3 (constant) and the angle of winding for the screw $\phi = 20°$ (constant). Of course, curves could be plotted for any desired value of L2/D and $\phi$.

The equation has been shown in the following ranges:

(1) Equivalent diameter of the bar between 30 mm and 80 mm.

(2) Passage area in the refining system between 2,500 sq. mm. and 30,000 sq. mm.

All of the figures of the accompanying drawings have been given by mere way of example, reference being made to the particular cases as shown. But the equations given are of of general validity.

What I claim is:

1. A screw feeder for extruding pasty materials, comprising a casing, and means for moving pasty materials through the casing, said moving means comprising a core having a portion of constant diameter and a helical flight on the core, and an extruding die through which the helical flight forces the pasty material to extrude it into a bar, said moving means having characteristics given by the following equation:

$$H = k \times \frac{A}{(\sin \phi)^{\frac{1}{2}}} \times \left( \frac{L2}{D} \right)^{\frac{1}{2}}$$

wherein H is the height of the flight above said portion of the core in millimeters, k is a constant between 0.9 and 1.8, L2/D is the ratio of the length of said portion of constant diameter to the external diameter of the flight, $\phi$ is the angle formed by the flight pitch and is between 15° and 25°, and A is $(-2701.16 + 853.85 \times \ln b)^{\frac{1}{2}}$, wherein b is the equivalent diameter in millimeters of the extruded bar and ln is the natural logarithm, said equivalent diameter being the diameter of the circular right section of a hypothetical bar having the same area of the right section as that of the cross section of the extruded bar.

2. A screw feeder as claimed in claim 1, wherein k is about 1.5.

3. A screw feeder for refining pasty materials, comprising a casing, and means for moving pasty materials through the casing, said moving means comprising a core having a portion of constant diameter and a helical flight on the core, and a refining screen through which the helical flight forces the pasty material to refine it, said moving means having characteristics given by the following equation:

$$H = k \times \frac{A}{(\sin \phi)^{\frac{3}{2}}} \times \left(\frac{L2}{D}\right)^{\frac{1}{2}}$$

wherein H is the height of the flight above said portion of the core in millimeters, k is a constant between 0.9 and 1.8, L2/D is the ratio of the length of said portion of constant diameter to the external diameter of the flight, $\phi$ is the angle formed by the flight pitch and is between 15° and 25°, and A is $(-69.91+0.0316 \times c)^{\frac{1}{2}}$, wherein c is the free passage area in square millimeters during refining, said free passage area being the available area for the product to pass through the screen free from all possible inclusions in the screen.

4. A screw feeder as claimed in claim 3, wherein k is about 1.5.

5. A screw feeder for refining and extruding pasty materials, comprising a casing, and means for moving pasty materials through the casing, said moving means comprising a core having a portion of constant diameter and a helical flight on the core, and a refining screen and an extruding die through which the helical flight forces the pasty material first to refine it and then to extrude it, said moving means having characteristics given by the following equation:

$$H = k \times \frac{A}{(\sin \phi)^{\frac{3}{2}}} \times \left(\frac{L2}{D}\right)^{\frac{1}{2}}$$

wherein H is the height of the flight above said portion of the core in millimeters, k is a constant between 0.9 and 1.8, L2/D is the ratio of the length of said portion of constant diameter to the external diameter of the flight, $\phi$ is the angle formed by the flight pitch and is between 15° and 25°, and A is $$\left(\frac{1}{-2701.16 + 853.85 \times \ln b} + \frac{1}{-69.91 + 0.0316 \times c}\right)^{-\frac{1}{2}},$$

wherein b is the equivalent diameter in millimeters of the extruded bar, said equivalent diameter being the diameter of the circular right section of a hypothetical bar having the same area of the right section as that of the cross section of the extruded bar, c is the free passage area in square millimeters during refining, said free passage area being the available area for the product to pass through the screen free from all possible inclusions in the screen, and ln is the natural logarithm.

6. A screw feeder as claimed in claim 5, wherein k is about 1.5.

* * * * *